United States Patent [19]
Ito

[11] 4,126,796
[45] Nov. 21, 1978

[54] MINIATURE REVERSIBLE MOTOR
[75] Inventor: Teruo Ito, Tokyo, Japan
[73] Assignee: Kabushiki Kaisha Daini Seikosha, Japan
[21] Appl. No.: 732,659
[22] Filed: Oct. 15, 1976
[30] Foreign Application Priority Data
Oct. 16, 1975 [JP] Japan .................................. 50-124523
[51] Int. Cl.² .............................................. H02K 1/02
[52] U.S. Cl. ............................... 310/40 MM; 310/41; 310/156; 58/39.5
[58] Field of Search ................... 310/40 MM, 49, 156, 310/41, 162–165, 152, 154, 155; 58/23 D, 39.5, 21.13

[56] References Cited
U.S. PATENT DOCUMENTS

| 3,077,555 | 2/1963 | Fredrickson | 310/49 |
| 3,644,809 | 2/1972 | Lahde | 310/41 |
| 3,719,839 | 3/1973 | Endo | 310/49 |
| 3,739,248 | 6/1973 | Wehde | 310/41 |
| 3,744,234 | 7/1973 | Kamijo | 310/41 |
| 3,800,175 | 3/1974 | Plotscher | 310/41 |

FOREIGN PATENT DOCUMENTS
2,426,583 12/1974 Japan .................................. 310/40 MM Primary Examiner—R. Skudy
Attorney, Agent, or Firm—Robert E. Burns; Emmanuel J. Lobato; Bruce L. Adams

[57] ABSTRACT

A miniature reversible motor comprising a rotor having a plurality of magnetic pole pairs, and a stator having a pole face opposite the periphery of the rotor. A magnetic member of high permeability magnetic material is positioned proximate the periphery of the rotor and magnetically couples with the magnetic poles of the rotor for determining a direction of rotation of the rotor. A positioning mechanism is operable for changing the position of the magnetic member relative to the periphery of the rotor to change the direction of rotation of the rotor determined by the relative position of the magnetic member and the periphery of the rotor.

5 Claims, 7 Drawing Figures

MINIATURE REVERSIBLE MOTOR

BACKGROUND OF THE INVENTION

This invention relates to a small sized reversible stepping motor, and especially to a motor for use in an electronic analogue watch.

In the conventional type, electronic analog-timepiece a second hand cannot reversibly rotate so that there is a time loss waiting for a few seconds to pass when said second hand is stopped in an advanced condition for seconds adjustment.

SUMMARY OF THE INVENTION

This invention aims to eliminate the above noted difficulty and insufficiency, and the object of the present invention is to provide a new small sized reversible stepping motor. The stepping motor according to the invention includes a movable magnetic member located at the outer periphery of said rotor and able to be positioned from outside of a watch including the stepping motor to allow a user of the watch to control the direction of rotation of the rotor according to the position of the magnetic member.

DESCRIPTION OF THE PREFERRED EMBODIMENTS

Figure 1A:
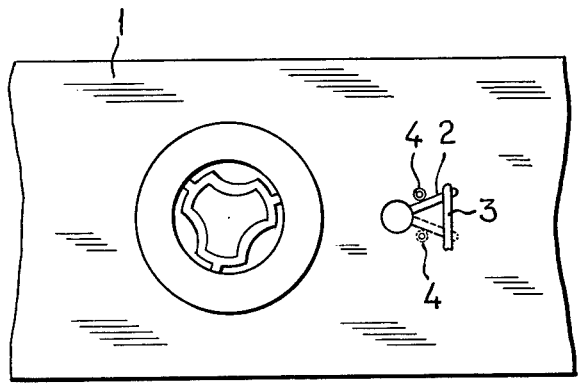
FIG. 1a shows a flat plan view of a stepping motor of the first embodiment of the present invention, a reversible rotation of said motor, the broken line shows a normal rotation of said motor.

FIG. 1a shows a flat plan view of a first embodiment of a stepping motor of the present invention, wherein numeral 1 is an upper supporting plate, and numeral 2 is rotary lever mounted having an axial dimension parallel to said upper supporting plate 1. A manual lever 3 able to be operated from outside of the watch is connected to said rotary lever 2, and the stopping location of said rotary lever is controlled by a pin 4. The lever 2 represented in solid line corresponds to one direction of rotation, and the representation in broken line corresponds to an opposite direction of rotation.

Figure 1B:
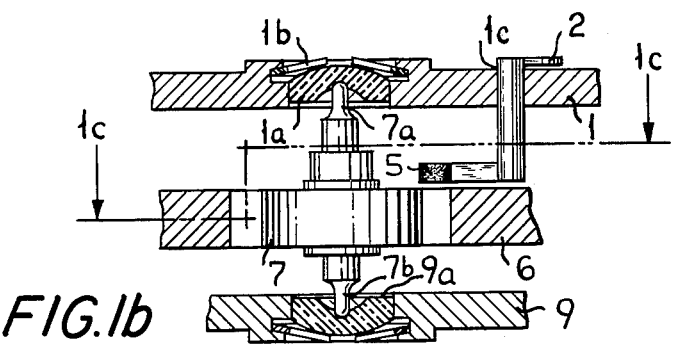
FIG. 1b shows a cross sectional view of FIG. 1a, FIG. 1c shows a flat plan view of the first embodiment of the present invention without an upper supporting plate shown in FIG. 1a, FIG. 1d shows structure for positioning a magnetic member of the stepping motor according to the present invention, FIGS. 2a-2c respectively show a flat plan view, a cross sectional view, and a flat plan view without an upper supporting plate of the second embodiment of the stepping motor according to the invention.

Further, the motor, as indicated in a cross sectional view of FIG. 1b, has a magnetic member 5 of a high permeability mounted at an end of said rotary lever 2. The magnetic member 5 is located at a gap between a stator 6 and rotor 7. A coil 10 is wound around part of the stator 6 and in use receives an electrical current to develop a magnetic field for magnetizing the stator 6. The coil comprises means for magnetizing said stator to effect rotation of the rotor.

One axial portion 7a of said rotor 7 is rotatably supported by the bearing 1a mounted in said upper supporting plate 1, and another axial portion 7b of said rotor 7 is rotatably supported by the bearing 9a mounted in lower supporting plate 9. The axial portions 7a, 7b and the bearings 1a, 9a together comprise means for rotatably mounting the rotor 7 on the supporting plates or supporting members 1, 9.

The magnetic member 5 is mounted at the end of said rotary lever 2 which is mounted for rotation in a hole 1c of said upper supporting plate 1.

Further said magnetic member 5 is closely located to the outer periphery of said rotor 7 when viewed in plan, and is located above said rotor 7.

Referring now to the operation of said stepping motor illustrated in the accompanying drawings:

Said rotary lever 2 and manual lever 3 are located at the position illustrated by the broken line of FIG. 1a when said rotor rotates in a normal direction. Therefore, stationary position of said rotor 7 tends towards a left direction relative to the position of the magnetic poles of said rotor 7, whereby said rotor 7 is rotated towards the left direction.

Further, in the occasion that the rotor 7 is to rotate in the opposite direction, the manual lever 3 is operated from outside the watch, said rotary lever 2 and manual lever 3 are positioned the as indicated by the solid line.

Figure 1D:
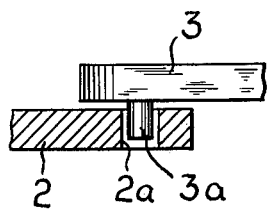
Figure 1C:
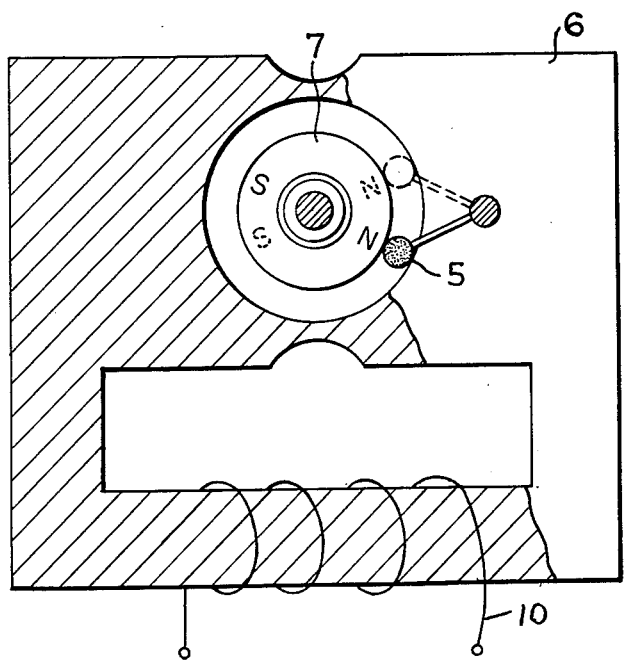

Therefore, the stationary location of said rotor 7 is indicated in FIG. 1c by the magnetic poles illustrated with solid line, namely said magentic poles tend towards a right direction reltive to the position of the magnetic poles of said rotor 7 in the absence of the magnetic member, whereby said rotor is rotated towards the right direction.

According to the present invention, said rotor is normally rotated in the normal condition, and said rotor 7 is reversibly rotated when said manual lever 3 is moved. Therefore it is possible to reversibly rotate the second hand of a timepiece including the stepping motor according to the present invention for the purpose of amending the seconds. Further it is possible to normally operate the second hand and to continuously precisely count the seconds indicated by the second hand by restoring said manual lever 3 to the normal position.

Said pin 4 controls the stopping location of said magnetic member 5 and said rotary lever 2.

Figure 2A:
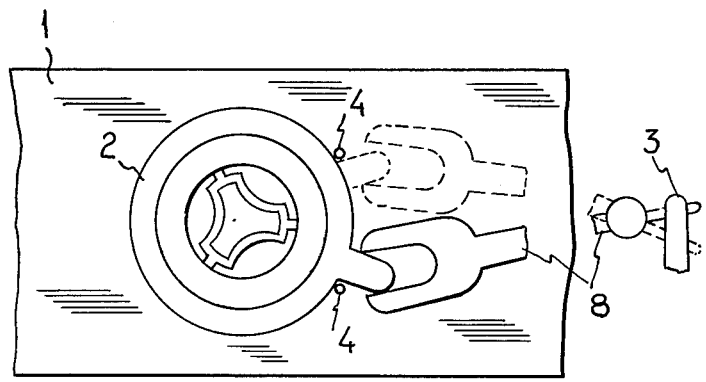

FIG. 2a shows the flat plan view of the second embodiment, wherein numeral 1 is the upper supporting plate, the rotary lever 2 is mounted on said upper supporting plate 1, the supplemental llever 8 is connected to the manual lever 3 by the same structure illustrated in FIG. 1d, and the stopping position of the rotary lever 2 is controlled by the pins 4. The rotary lever 2 is a ring-shaped member having a diameter on the order of the diameter of the rotor 7. The ring-shaped rotary lever 2 is positioned concentric with the axis of rotation of the rotor 7 and is mounted on the supporting member 1 for rotation about the axis of rotation of the rotor 7 proximate the periphery of the rotor 7.

Figure 2B:
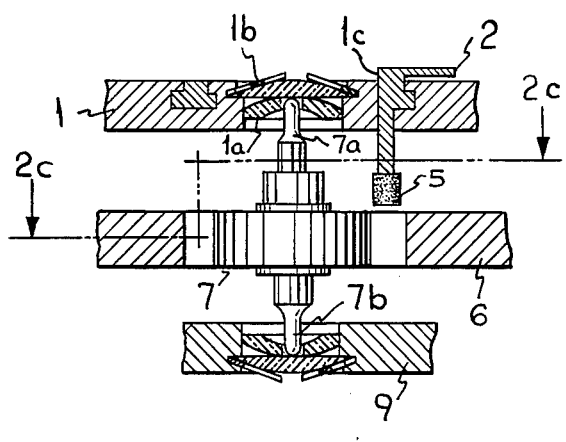
Figure 2C:
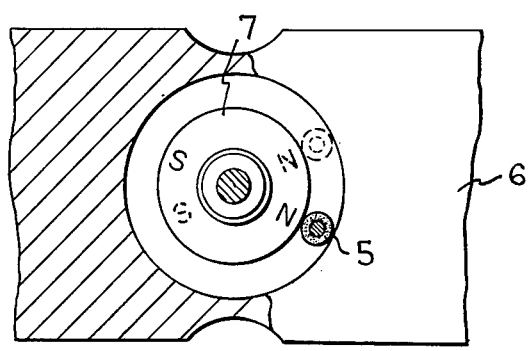

Further FIG. 2b and FIG. 2c respectively show the cross sectional view and flat plan view with the upper supporting plate removed, and the structure illustrated in these FIGS. corresponds to the structure of the first embodiment.

As shown in FIG. 2a, the supplemental lever 8 is able to amplify the amount of movement of said manual lever 3 and transmits the movement to said rotary lever 2.

According to the present invention, it is possible to easily amend the seconds time, and therefore it is very efficient to apply the present invention to an electronic analogue watch.

I claim:

1. A miniature reversible motor, comprising:
a rotor having an axis of rotation and a plurality of permanant magnetic pole pairs spaced peripherally about said rotor;
a stator having a circular pole face opposite the periphery of said rotor and concentric with the axis of rotation of said rotor;
means for magnetizing said stator to effect rotation of said rotor;
a magnetic member of high permeability magnetic material positioned proximate the periphery of said rotor and magnetically coupling with magnetic poles of said rotor for determining a direction of rotation of said rotor;
means for mounting said magnetic member proximate the periphery of said rotor; and
wherein said means for mounting includes positioning means operable for changing the position of said magnetic member relative to the periphery of said rotor to change the direction of rotation of said rotor determined by the relative position of said magnetic member and the periphery of said rotor.

2. A miniature reversible motor according to claim 1, further comprising a pair of supporting members respectively disposed above and below said rotor, and means for rotatably mounting said rotor on said supporting members; and wherein said means for mounting including said means for positioning is comprised of a shaft extending generally parallel to the axis of rotation of said rotor and mounted for axial rotation on one of said supporting members, an arm extending outwardly from said shaft and having a free end proximate the periphery of said rotor, wherein said magnetic member is mounted on the free end of said arm, and means operable for rotating said shaft to change the relative position between said magnetic member mounted on the free end of said arm and the periphery of said rotor.

3. A miniature reversible motor according to claim 1, further comprising a pair of supporting members respectively disposed above and below said rotor, and means for rotatably mounting said rotor on said supporting members; and wherein said means for mounting including said means for positioning is comprised of a ring-shaped member having a diameter on the order of a diameter of said rotor, concentric with the axis of rotation of said rotor and mounted on one of said supporting members for rotation about the axis of rotation proximate the periphery of said rotor, wherein said magnetic member is mounted on said ring-shaped member proximate the periphery of said rotor, and means operable for rotating said ring-shaped member for changing the relative position between said magnetic member and the periphery of said rotor.

4. A miniature reversible motor according to claim 3, wherein said means operable for rotating are comprised of a protrusion extending from the periphery of said ring-shaped member outwardly thereof, and a lever having an end portion including means for engaging said protrusion and positioned to engage said protrusion to rotate said ring-shaped member upon movement of said lever, thereby to change the relative position between said magnetic member and the periphery of said rotor.

5. A miniature reversible motor according to claim 1, wherein said means for magnetizing said stator is comprised of a coil wound on said stator for receiving electrical signals to develop a magnetic field in response thereto and magnetize said stator.

* * * * *